United States Patent [19]
Theijsmeijer et al.

[11] 3,854,574
[45] Dec. 17, 1974

[54] LUGGAGE DISPENSING CONVEYOR

[75] Inventors: Frederik Theijsmeijer, Elwood City, Pa.; Bert Krivec, Waukesha, Wis.

[73] Assignee: Rexnord Inc., Milwaukee, Wis.

[22] Filed: May 29, 1973

[21] Appl. No.: 364,473

[52] U.S. Cl. ............... 198/181, 74/221, 198/103
[51] Int. Cl. ............................................ B65g 15/00
[58] Field of Search .......... 198/129, 181, 182, 103, 198/209; 74/221

[56] References Cited
UNITED STATES PATENTS

| | | | |
|---|---|---|---|
| 499,381 | 6/1893 | Galland | 74/221 |
| 2,787,366 | 4/1957 | Sykokis | 198/181 |
| 2,928,356 | 3/1960 | Tredwell | 198/177 R |
| 3,333,678 | 8/1967 | Rodman | 198/181 |
| 3,702,130 | 11/1972 | Fraenzke | 198/181 |
| 3,718,249 | 2/1973 | Hess | 198/181 |

Primary Examiner—Richard E. Aegerter
Attorney, Agent, or Firm—Sughrue, Rothwell, Mion, Zinn & Macpeak

[57] ABSTRACT

An inclined plane conveyor of the type used for luggage dispensers for traversing an endless non-circular path and having interconnected relatively slidable plate surfaced flights is driven from the outside perimeter of a non-circular path through a main drive chain from a large diameter cycloidal tooth sprocket. Each flight has a support member in the form of a channel rib which carries two support wheels and a flight plate is bent longitudinally to prevent a gap and mounted so that it may shift at the top edge relative to the support member. The flight material may be stainless steel with a plastic cap on the free edge or polyurethane with a steel back-up plate.

19 Claims, 15 Drawing Figures

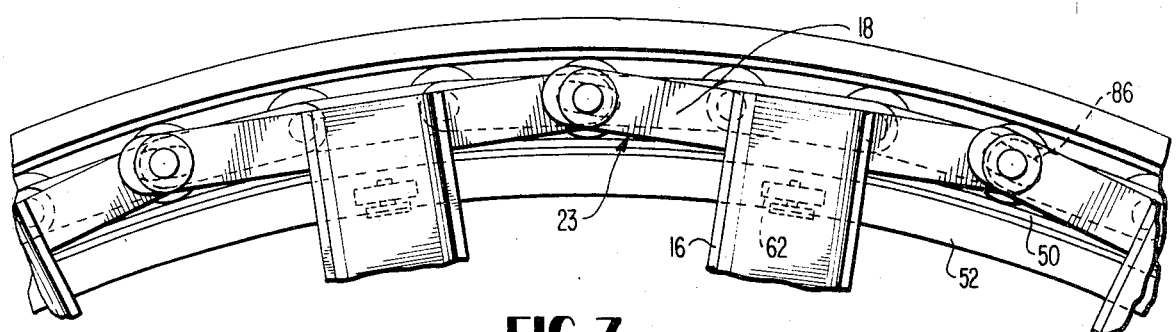
FIG. 7
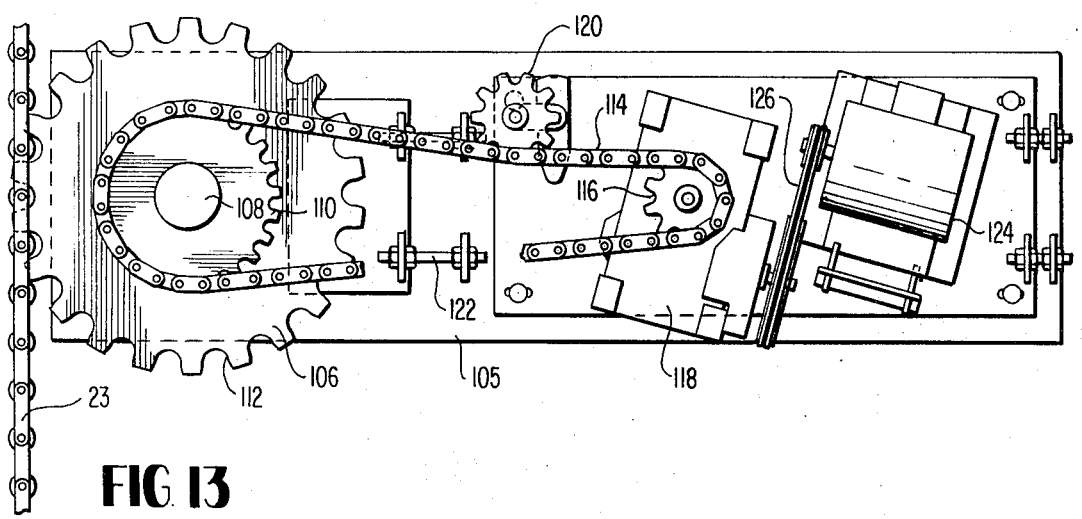
FIG. 13
FIG. 6
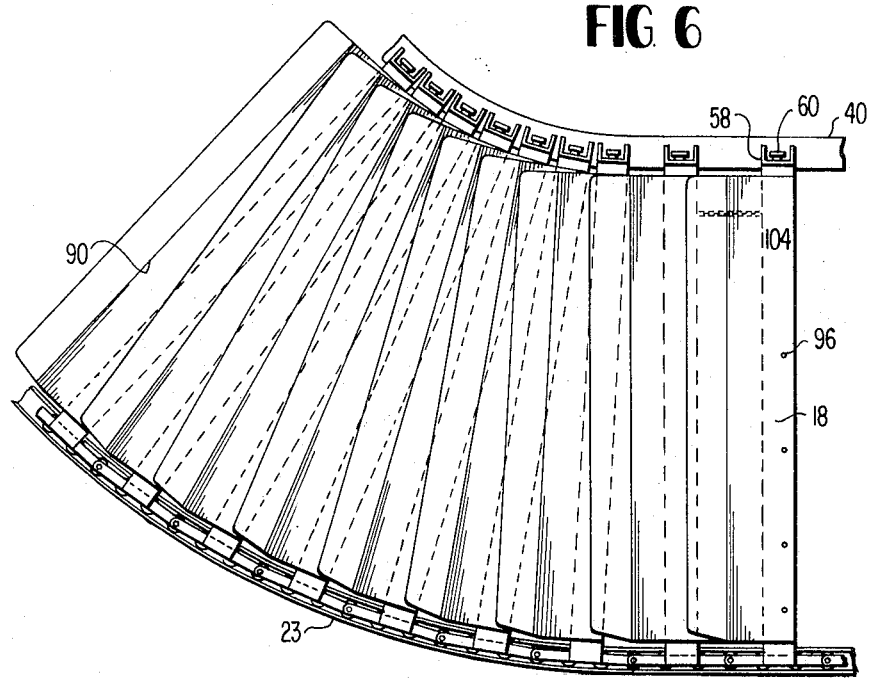

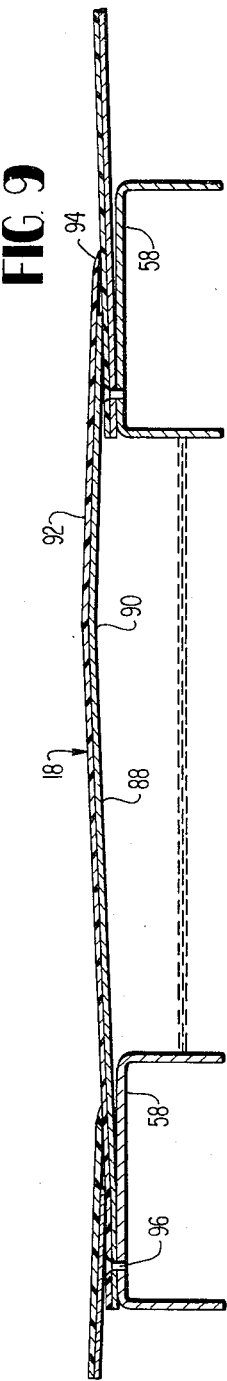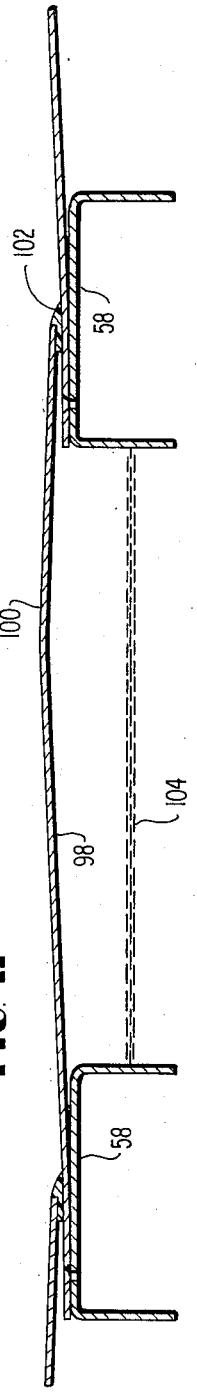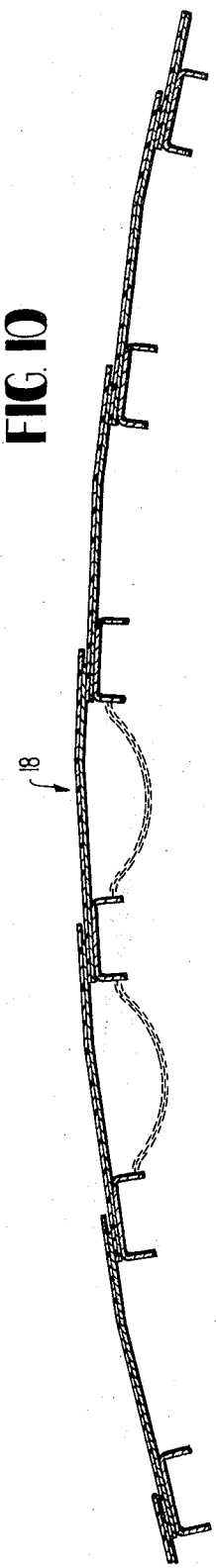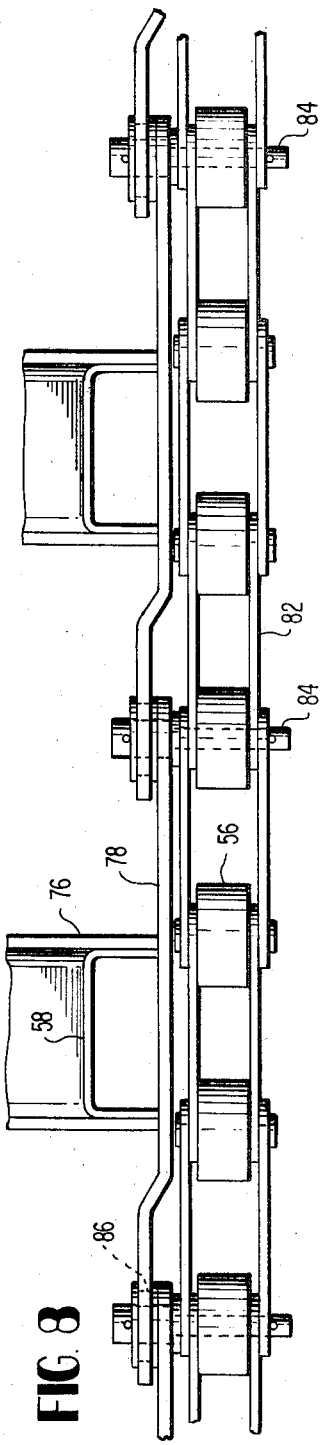

LUGGAGE DISPENSING CONVEYOR

BACKGROUND OF THE INVENTION

1. Field of the Invention

This invention relates to improvements in conveyors and especially to a conveyor useful as a luggage dispenser which travels in and endless non-circular path and has a plurality of interconnected relatively slideable conveyor flight plates.

2. Description of the Prior Art

It is known in the prior art to distribute luggage or other parcels by means of an endless conveyor having a plurality of flights traveling in a closed path such as for dispensing luggage and the like. One example is U.S. Pat. No. 3,360,104, assigned to the assignee of this application. In such conveyors, typically used in airports for dispensing luggage to be claimed by airline passengers, the luggage is deposited on the conveyor and slides down an inclined flight to the outer periphery where it is arrested by a bumper and is carried around in a circle where the passengers may claim it. Not only have such luggage conveyors been circular in plan, they have also been non-circular endless paths in which the flights move relative to one another and slide on one another. Examples of this type of conveyor in this art are shown in the U.S. Pat. Nos. 3,361,249; 3,410,390; 3,702,130 and 3,718,249. The art is now becoming fairly well developed, but even so leaves room for improvement in a number of areas including the drive of the flights which should be as simple, smooth and quiet as possible. It should also provide easy accessibility for maintenance. It should give smooth starts without pulsation and prevent loud noises which could disturb or scare airline passengers who would claim their luggage. Another area in which the crowded art needs improvement is in the construction of the flights themselves. In a non-circular conveyor, the flights will of necessity rub on one another and flex partially with regard to one another as they go around the curves from the straight portions. This relative sliding movement scrapes the surface of the flights and baggage thrown on the flights also causes scraping and marring, and consequent disfiguring of the surface of the flights. It has been previously proposed for example in U.S. Pat. No. 3,702,130 to create flights with complicated bends in them in which the plates of the flights were load bearing. This causes complications in both the complex bends and providing strong enough material to bear the loads.

The prior art teaches a bumper at the lower inclined periphery of the luggage dispensing conveyor which bumper moves with the conveyor. However, with the conveyor being inclined, the bumper must be high enough to prevent the luggage from falling off as it is fed onto the conveyor. This in turn makes the height of the bumper of an uncomfortable height for the passengers to remove their baggage by having to lift them a high vertical distance. In other words, some compromise is necessary between the tendency for the baggage fed into the inclined flights to flop over the edge and the desirability of having the bumper as low as possible.

SUMMARY OF THE INVENTION

This invention attempts to solve the problems discussed above in a conveyor of the type having relatively slideable plates by providing an inclined plane conveyor surface with a smooth and quiet drive of simple construction, a unique flight construction which prevents gaps and is lightweight, and yet strong, and safe by eliminating pinch points and gaps, and a low height moving bumper combined with a fixed bumper at the discharge point.

More specifically, the drive is to a main drive chain connected to the outer perimeter of the flights through a large diameter of cycloidal tooth sprocket cooperating with rollers in the roller chain. The sprocket is mounted on a stationary stub shaft and driven from a motor through a reducer.

Each flight is a separate unit with a formed channel rib, two vertical support wheels, one at the top and one at the bottom, and a continuous segmented bumper at the lower end. Each flight includes a plate having a single longitudinal bend and each plate is mounted to the rib except at the upper end so that the flights may bend and twist during movement of the conveyor and still not open any gaps or pinch points. The flight material can either be stainless steel, cast polyurethane with a steel back-up plate, or any other suitable plastic or elastomeric material.

Each flight carries its own integral skin polyurethane bumper which moves with the flight and gives the unit a continuously moving bumper. However, an auxiliary bumper is provided at the induction area to protect passengers, absorb impacts and prevent luggage from falling off the periphery of the conveyor as it is fed down the incline.

BRIEF DESCRIPTION OF THE DRAWINGS

FIG. 6 is a top plan view of the conveyor flight and drive chain passing a corner;

FIG. 7 is a detailed top plan view of an outer portion of the conveyor flights with the flight plates removed;

FIG. 8 is a front elevation view of the detail shown in FIG. 7;

FIG. 9 is a sectional elevation view taken along line 9—9 of FIG. 1;

FIG. 10 is a sectional elevation view through a curve taken along line 10—10 of FIG. 1;

FIG. 11 is a sectional view of another embodiment of the flight plate construction taken on a section similar to that of FIG. 9;

FIG. 13 is a top plan detail view of the drive for the conveyor of this invention;

DETAILED DESCRIPTION OF THE PREFERRED EMBODIMENTS

Figure 1:
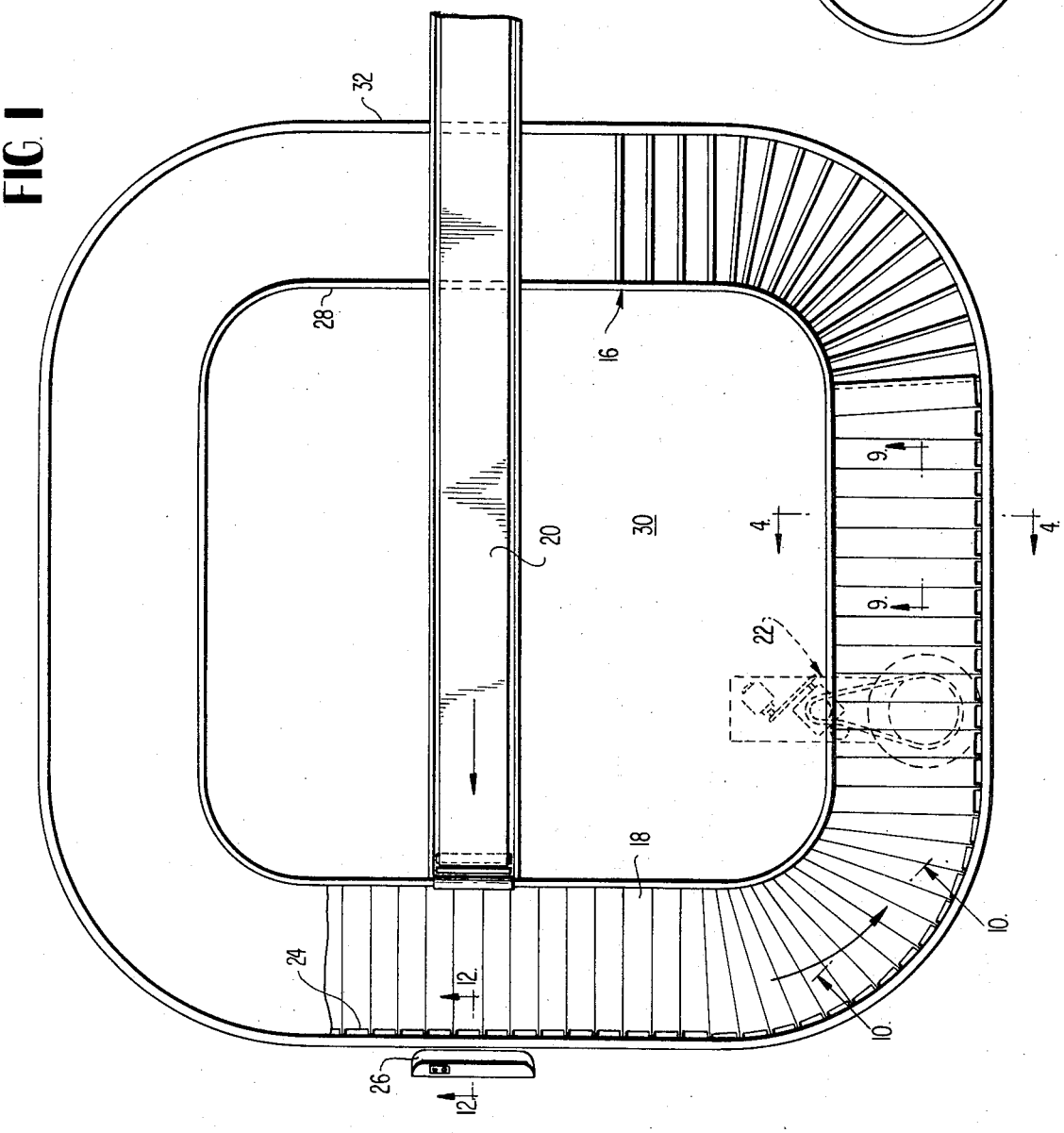
FIG. 1 is a top plan view of one form of conveyor of this invention.

As shown in FIG. 1, conveyor 16 traverses an endless non-circular path. The conveyor is made up of a plurality of inclined flights 18 and the conveyor is fed by a suitable feed conveyor 20. Drive means 22 drive a chain 23 to which the outer portion of each flight 18 is attached to drive the conveyor in its endless path. A traveling bumper 24 is attached to each flight and a fixed auxiliary bumper 26 extending above the height of the traveling bumper is positioned at the point of discharge of feed conveyor 20. The conveyor flights travel around their endless path between an inside surface 28 within which is a suitable decking 30 and an outside skirt 32.

The conveyor is particularly adapted for handling luggage, for example at airports, where the luggage is fed in from the feed conveyor 20, slides down the inclined flights 18, abuts against the bumper 24. The auxiliary bumper 26 prevents the individual pieces of luggage from falling off the conveyor. The pieces of luggage are carried around by the conveyor for removal by people standing adjacent the outer edge of the skirt 32 who lift their luggage from the conveyor.

Figure 2:
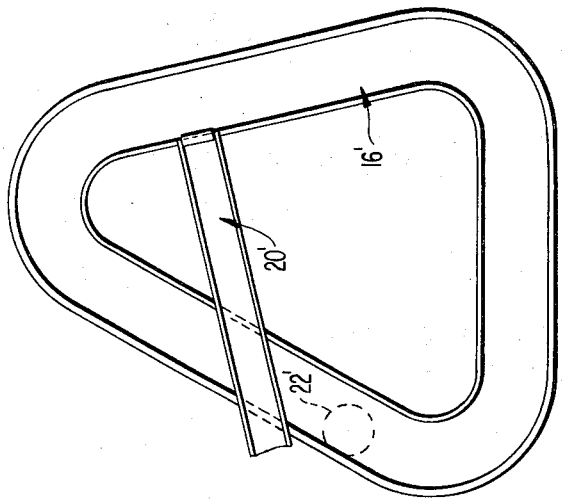
FIG. 2 is a top plan view illustrating another form the conveyor of this invention may take.
Figure 3:
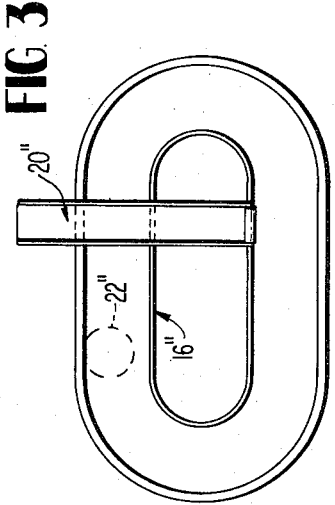
FIG. 3 is a top plan schematic view illustrating a still further form the conveyor of this invention may take.

FIGS. 2 and 3 illustrate other non-circular forms the endless conveyor may take. In FIG. 2, the conveyor 16' is in the form of a triangle with the feed conveyor 20' feeding into one side, and the drive means 22' driving another side at a straight portion thereof. In FIG. 3, the endless non-circular conveyor 16" is generally oval shaped with the feed conveyor 20' feeding in from the top and the drive means 22' driving the chain again from a straight side immediately following a curve. In addition to the arrangements shown in FIGS. 2 and 3, an almost infinite number of arrangements can be made including those in which the feed conveyor 20 comes up through the center of the decking 30 instead of over it, and including inside as well as outside curves.

Figure 4:
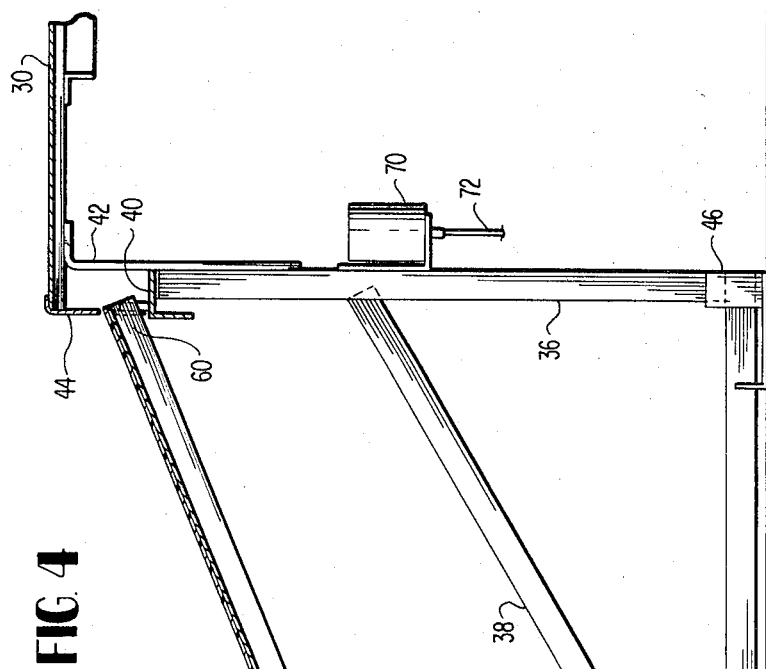
FIG. 4 is a side sectional elevation view taken along line 4—4 of FIG. 1.
Figure 5:
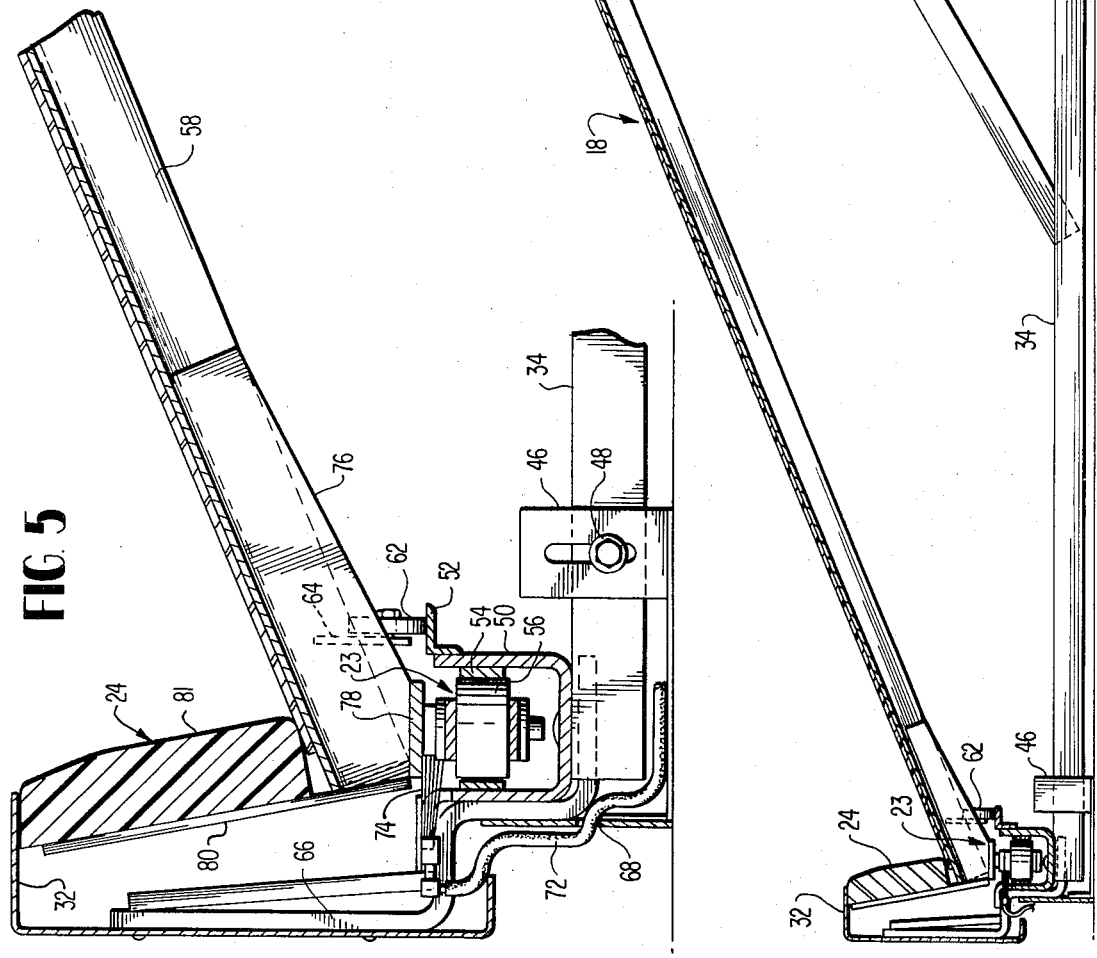
FIG. 5 is an enlarged detail side sectional view of an outer end of a conveyor flight shown in FIG. 4.

FIG. 4 and FIG. 5 illustrate the support for the conveyor 16 and the flights 18 thereof, and show the flights 18 as inclined at an angle of 22½° to insure delivery of luggage to the periphery of the conveyor for removal by people who woudl normally stand around the outside periphery. The conveyor has a plurality of spaced frame base members 34 connected to uprights 36 and braced by diagonal brace 38. The top of frame upright 36 supports an endless inside track 40 as well as a top deck support bracket 42. A suitable flange curtain 44 may extend down from the upper deck toward the top portion of each flight 18. The frame base 34 is supported on adjustable feet 46 which are adjustable relative to the floor by a bolt and slot arrangement 48, FIG. 5. A chain guide endless member 50 which is U-shaped in section and defines the path of the endless conveyor also supports an outside track flange 52. Guide strips 54 on the inside sides of the U-shaped chain guide provide low friction and noiseless operation of the chain rollers 56 of chain 23.

Each flight 18 includes a longitudinally extending flight support rib in the form of a channel which in turn mounts an inner roller 60 on a roller bracket for cooperating with track 40 and an outer roller 62 carried by roller bracket 64 cooperating with outer rail 52.

A Z-shaped support bracket 66 is attached to the outer curtain 32 and supports the same from the frame 34.

A lubricator including a drop feed oiler 70 is provided for lubricating the chain 23 and feeds oil through an oil tube 72 extending through holes 68 in the skirt 32 to an elbow and brush 74 which brush extends through the bracket 66 to contact the chain 23.

For connecting the outer end of each flight 18 to the bumper 24 and the chain 23, there are provided connecting plates 76 welded to the outside flanges of rib 58 and abutting and welded to each link 78 of chain 23 and to a back rest 80 carrying a resilient bumper pad 81.

FIGS. 7 and 8 show the chain 23 in more detail. The chain is a standard form of commercially available chain in which the rollers 56 are connected by links 82. About every foot of the chain has a pin 84 extending through the center of the roller and through slots 86 in the ends of each link 78. The links are connected through the pins 84 and are separated by washers as shown in FIG. 8. This arrangement with the elongated slots 86 and the washers allow the links 78 to adjust themselves as they need to while going around a curve. FIG. 6 shows the arrangement of the flights with a portion of the top deck removed and the lower bumper to illustrate the chain drive from the outer periphery of each flight and the upper idling support for each flight.

The construction of the surface of each flight is shown in FIG. 6 taken with FIGS. 9 and 10. For each flight 18, there is a flight plate 88 of carbon steel or the like with a longitudinal bend line 90 extending the length of the flight parallel to the edge surfaces. An outer portion of each flight plate 91 is removed as shown in FIG. 6 to allow the flight to traverse the corner, on an external radius. Overlapping each flight plate 88 is a cast urethane sheet 92 which has its outer edge 94 extending beyond the outer edge of the flight plate 90. The cast urethane may have a pebbly grained or other pattern surface to reduce sliding friction and may be in various colors. It does not scar or scuff easily and protects the surface of the flight. The outer tip 94 may be angled and because the cast urethane sheet 92 is quite flexible, it will overlap the flight plate 88 and conform to the bend line 90. Each flight plate 90 and covering urethane sheet 92 are secured by fasteners 96 extending through the support rib channel 58 as shown in FIG. 9. These fasteners, however, extend only a portion of the length toward the inside of the flight, see FIG. 6, to allow the top portion of the flight to move and accommodate itself during traversing of curves.

FIG. 10 shows the position of the flight plates during the traversing of a curve at which time the bend line 90 and the inherent resilience of the flight plate 88 cause the flight plate to bear on the next adjacent urethane cover sheet and not open and create a gap, as would be the case without a bend or other resilient means for holding the tip of each flight plate adjacent the next flight plate.

FIG. 11 shows another modification in which flight plates of the same construction and plan as shown in FIG. 6 are secured by fasteners to channel ribs 58 as before, but instead of having a protective urethane sheet 92, the flight plates 98 are themselves formed of stainless steel. Again, there is the longitudinal bend line 100 extending along the length of each flight plate and along the tip of each flight plate there is a protruding plastic cap 102 to prevent undue scoring or chaffing of the underlying flight plate when traversing the curves and to present a soft edge to luggage or people coming in contact with the flight plate edge and prevent damage or injury thereto.

As shown in FIGS. 9 and 10, a safety chain 104 is secured to the flanges of adjacent ribs 58 of each flight and the top portion thereof, see FIG. 6, so that if one of the flights were to stick, for example, if roller 60 were not operating correctly, the flight in front would tend to pull it along.

The drive means 22 is shown in more detail in FIG. 13. The drive means is mounted on a base 105 and includes a large diameter drive sprocket 106 on a stub shaft 108 with a driven sprocket 110. The tooth forms 112 of the drive sprocket 106 are cycloidal for cooperating with the rollers 56 of the chain 23 as the chain is moving in a straight line with the pitch of the chain being substantially smaller than the pitch of the flight supporting ribs 58. This results in elimination of pulsations as compared with a chain which has a pitch equal to the flight supporting ribs. Sprocket 110 is driven by a chain 114 also trained around sprocket 116, extending from a gear reducer unit 118. Suitable tensioner sprockets 120 are provided and take up rod and nut assemblies 122 are positioned between a support for the drive sprocket 106 and the gear reducer case 118. An electric motor 124 drives the unit through a V-belt and pulley drive 126 to the gear reducer unit 118.

Figure 14:
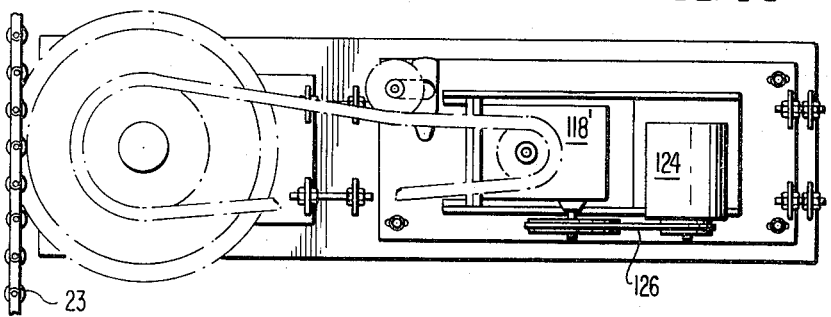
FIG. 14 is a top plan detail view of an alternative drive arrangement.

An alternative form of drive is shown in FIG. 14 in which the gear reducer case 118 is of a different form and the belt and pulley drive 126 is perpendicular to the travel of the chain 23, requiring the motor 124 to be positioned differently as shown.

Figure 12:
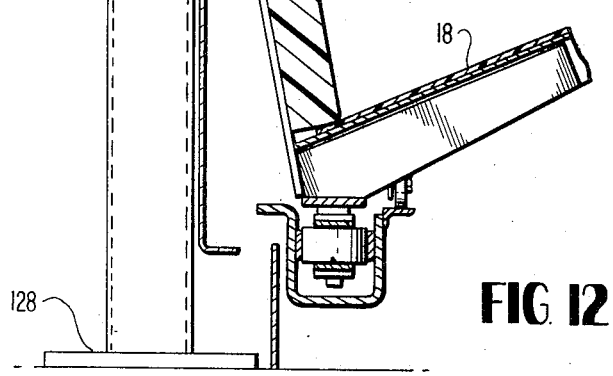
FIG. 12 is a sectional elevation view of an auxiliary bumper taken along line 12—12 of FIG. 1.

FIG. 12 illustrates the auxiliary bumper 26 positioned at the outlet from the feed conveyor 20 as shown in FIG. 1. The auxiliary bumper 26 includes a flanged stand 128 secured to the floor outside the periphery of the curtain 32. An upper bumper portion 134 extends along and above the level of moving bumper 24 to prevent luggage, which may jump bumper 24, from jumping outside the conveyor and injuring any onlookers. Suitable controls such as key operated on-off switches 132 may be provided at the top of auxiliary bumper 26 for operation of the conveyor motor by an attendant.

Figure 15:
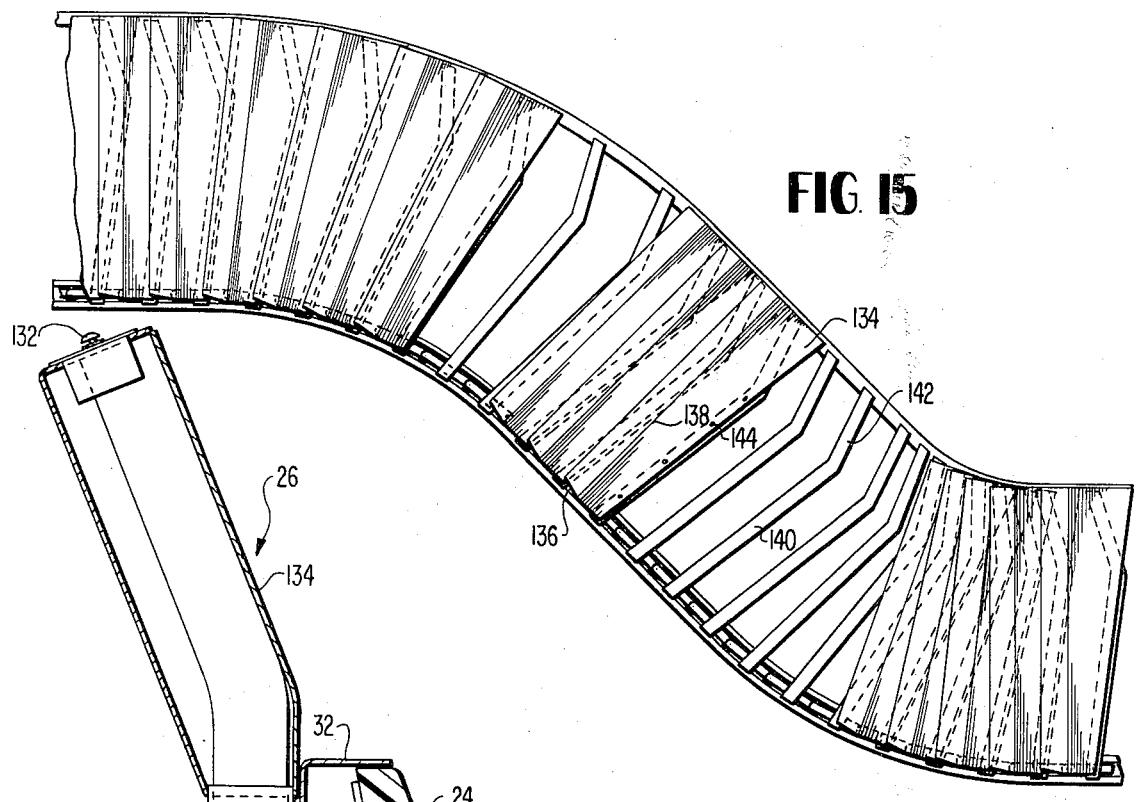
FIG. 15 is a top view of an alternative form of flight construction capable of traversing both inside and outside radii.

FIG. 15 illustrates a modification in the flight construction in order to accommodate both internal and external curves. In this modification, the flight plates 134 are generally trapezoidal in shape being wider at the top than at the bottom. A portion 136 is cut out as in the previous embodiment and the ribs which support the flight plates include a portion 140 extending parallel to the surface of one edge of the flight plate and a portion 142 extending at an angle thereto at the upper portion of the rib. As an example, the upper and lower portions of the rib are inclined compared to the radial line to enable the conveyor to negotiate both internal and external curves and still give adequate support for the flights. Fasteners 144 extend only along the lower portion 140 of the rib again to allow the upper portion of each flight plate to move or accommodate itself relative to the rib in negoitiating the internal and external curves.

It is believed the operation of the conveyor will be evident from the foregoing description, but a brief summary will be given, particularly with regard to use of the conveyor as a high capacity luggage dispenser highly versatile so as to fit in any area of a terminal building. Luggage is fed in on feed conveyor 20 and dumped down the inclined flights 18 at the position of auxiliary bumper 26. An attendant operating controls 132 causes motor 124 to drive the large diameter sprocket 106 and in turn drive chain 23 which is guided in channel 50 around the outside periphery of the conveyor. The moving bumper 24 travels with the individual flights 18 and each flight is supported at the top and bottom by wheels 60 and 62. The flight surface retains its original finish even with hard wear, particularly in the cast polyurethane coating. The bumper skirt height from the floor is quite low, for example 13 inches, and is recessed as shown in FIGS. 4 and 5 to provide toe space. The passengers may step up to the outside periphery of the conveyor and lift off their baggage without having to lift the baggage a high amount. The drive arrangement provides for ease of maintenance and silent operation.

We claim:

1. In a conveyor useful for handling luggage to be claimed and having an inclined conveyor surface traversing an endless non-circular path, the conveyor being of the type having a plurality of interconnecting inclined flights with relatively slideable plates moving together along the path and supported by rollers from inside and outside rails, an endless chain connected to the flights for moving the flights, the chain being guided around the outside periphery of the path and attached to the outer end of each flight, the improvements comprising:

a large diameter sprocket wheel with cycloidal teeth mounted on a stationary stub shaft and contacting rollers of the chain on a straight portion of the chain path, motor means positioned within the path and connected by power transmission means to drive the sprocket wheel, and each flight further comprising;

a structural flight support rib extending the length of each flight and attached to the chain at a roller thereof, the chain having a substantially smaller pitch than the flight support rib, and each plate for each flight having a single longitudinal bend so that the free exposed edge of each plate is positioned more closely adjacent the surface of the adjacent plate that it overlaps, and means for rigidly attaching each plate to the support rib.

2. A conveyor as in claim 1 wherein each plate is metal and the free edge of the bent-down portion carries a portruding plastic member which protrudes outwardly and upwardly at the free edge to form a protective edge and to prevent a gap without scarring the metal during relative sliding of adjacent plates and present a soft edge to prevent damage by preventing people or luggage from coming into contact with this edge.

3. A conveyor as in claim 2 wherein the metal plate is of stainless steel and the plastic member is an elongated cap-like member of sheet form which covers the entire metal plate and extends beyond the free edge thereof.

4. A conveyor as in claim 1 wherein each plate is a metal plate overlapped by a sheet secured thereto, the sheet being of a material selected from the group consisting of plastic and elastomeric sheet materials.

5. A conveyor as in claim 4 wherein the plastic sheet is cast urethane resin with a tapered edge and patterned top surface to reduce friction and the metal is steel.

6. A conveyor as in claim 1 wherein the structural support rib is an inverted U-shaped channel, and further comprising a traveling bumper attached to each flight extending approximately normal to the surface of the flight.

7. A conveyor as in claim 1 wherein the plate surfaces are attached to the support rib along the length except at the upper end.

8. A conveyor as in claim 6 further comprising additional structural support members at the sides of the U-shaped channel adjacent the lower end thereof for mounting the channel to the chain.

9. A conveyor as in claim 6 wherein the rollers have a fixed axis and are supported from the center of the U-shaped channel at the upper and lower ends thereof.

10. A conveyor as in claim 1 wherein the drive chain has rollers therein mounted on a vertical axis and at a pitch substantially less than the pitch of the supporting ribs and cooperating with a guide for lateral guiding of the roller end of the flight and wherein one side of the guide has a flange constituting a track for support roller at the lower end of the flight.

11. A conveyor as in claim 1 further comprising an auxiliary bumper positioned outside the flight of the conveyor at a position where luggage or other unit elements are fed onto the inclined conveyor.

12. A conveyor as defined in claim 1 wherein the top portion of each flight is connected by a chain having a length equal to the maximum required space between flights.

13. A conveyor as in claim 12 wherein the chain is attached to U-shaped support members of each flight.

14. A conveyor as in claim 1 wherein the structural support member of each flight is dog-legged in shape with the top portion of the dog-leg trailing the bottom portion.

15. A conveyor as in claim 14 wherein the dog-leg support is U-shaped in section.

16. A conveyor as in claim 1 further comprising a drop feed oiler feeding a brush contacting the chain for oiling the chain.

17. A conveyor for handling luggage to be claimed and for operation in a given direction in a closed, horizontal but non-circular loop, comprising a frame having inner upper and outer lower endless parallel tracks and a surrounding guideway which defines said loop, an endless series of inclined flights, each flight comprising a rigid member and a plate attached to said member along the forward margin of the plate having reference to said direction, the rear margin of each plate overlying and being slidable on the following plate, each member having an upper and a lower roller for operation on the respective tracks and a link overlying said guideway and having a forward end and a rearward end, the adjacent ends of adjacent flight links being in overlying relation, one end having a bearing hole and the other end having a slot, an endless roller chain disposed for operation in said guideway and having a number of pins and interconnecting links which number is a multiple of the number of flights of the conveyor, said number of pins being equally spaced and extended upwardly through each hole and slot of the overlying ends of said flight links for their lateral interconnection and to drive the conveyor, each such extended pin having upper retaining means whereby the chain is supported vertically in the guideway by the flight members including the rollers thereof, and a cycloidal sprocket extending into said guideway and having tooth pockets which engage the rollers of the chain to drive the conveyor, said slots allowing the spacing between the flights to be varied with the degree of curvature of the guideway as required by the greater chordal action of the flight links relative to that of the chain links, the reduced pitch of the sprocket and drive chain providing the improved drive of the conveyor by the sprocket.

18. The conveyor of claim 17 wherein the rearward end of each flight link is provided a slot and overlies and bears on the forward part of the following flight link which is provided with the bearing hole.

19. The conveyor of claim 17 wherein each flight includes a single upper and a single lower roller, the overlying parts of the flight links being secured on each pin between its retaining means and the chain to stabilize each flight on its rollers.

* * * * *